United States Patent
Sun

(10) Patent No.: US 7,228,069 B2
(45) Date of Patent: Jun. 5, 2007

(54) FOCUSING METHOD FOR DIGITAL CAMERA USING PLURAL SPATIAL FREQUENCIES

(75) Inventor: Wen-Hsin Sun, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 179 days.

(21) Appl. No.: 11/106,807

(22) Filed: Apr. 15, 2005

(65) Prior Publication Data

US 2005/0232620 A1 Oct. 20, 2005

(30) Foreign Application Priority Data

Apr. 16, 2004 (TW) ............... 93110627 A

(51) Int. Cl.
G03B 13/34 (2006.01)
G03B 13/00 (2006.01)
(52) U.S. Cl. .................. 396/101; 348/355
(58) Field of Classification Search .............. 348/355, 348/349, 354; 396/125, 127, 101
See application file for complete search history.

(56) References Cited

U.S. PATENT DOCUMENTS 5,323,204 A * 6/1994 Wheeler et al. .............. 396/60

2003/0063212 A1* 4/2003 Watanabe et al. ........... 348/349
2004/0145671 A1* 7/2004 Wang .......................... 348/349

FOREIGN PATENT DOCUMENTS

CN 01202112 12/2001

* cited by examiner

Primary Examiner—W. B. Perkey
Assistant Examiner—Chia-how Michael Liu
(74) Attorney, Agent, or Firm—Morris Manning & Martin LLP; Tim Tingkang Xia, Esq.

(57) ABSTRACT

An automatic focusing method includes the following steps: providing a digital camera module, which includes a lens member, an image sensor member, a distance-measuring member, a signal-processing member, a drive control member, and a drive member; measuring an object distance using the distance-measuring member, and transmitting the object distance to the signal-processing member for generating a control signal; the drive control member driving the drive member according to the control signal; and the drive member driving the image sensor member or the lens member to a position determined by the control signal. The step of providing the digital camera module includes: providing the lens member, the image sensor member and the distance-measuring member; measuring a depth of focus of the lens member; establishing a range of error of movement of the drive member; and selecting a suitable signal-processing member, drive control member, and drive member.

15 Claims, 4 Drawing Sheets

FOCUSING METHOD FOR DIGITAL CAMERA USING PLURAL SPATIAL FREQUENCIES

BACKGROUND OF THE INVENTION

1. Field of the Invention

The present invention relates to automatic focusing methods used with photography and imaging equipment, and particularly to an automatic focusing method for a digital camera with high focusing accuracy.

2. Description of the Related Art

With the development of the technology of digital signal processing, digital cameras are now highly favored by consumers. Some digital cameras have focus adjusting mechanisms so that they can take high quality photos.

China Pat. No. 01202112 issued on Dec. 5, 2001 provides a camera module with a fixed focus. As represented in FIG. 4, the camera module 40 includes a substrate 41, an image sensor member 44, a tubular body 42, a lens member 43 and an elastic member 45. The lens member 43 and the image sensor member 44 are received in the tubular body 42 in that order from top to bottom, with the image sensor member 44 being held on the substrate 41. Aligned screw holes (not labeled) are defined in one end of the tubular body 42, the elastic member 45, and the substrate 41. Screws 46 are engaged in the screw holes, thereby attaching the tubular body 42, the elastic member 45 and the substrate 41 together.

To enable high quality photos to be taken, the image sensor member 44 should be positioned at the imaging plane of the lens member 43. The screws 46 are rotated inward or outward so that the elastic member 45 is compressed or decompressed, thereby adjusting the distance between the lens member 43 and the image sensor member 44. This is done until the picture captured by the camera module 40 is focused and clear to the human eye. However, the focusing procedure of the camera module 40 is rather laborious and time-consuming.

To solve the above-described shortcomings, many automatic focusing apparatuses and methods have been developed. However, typical automatic focusing apparatuses are assembled with a drive member having a predetermined accuracy of movement, which does not correspond to a depth of focus of a lens member of the automatic focusing apparatus. This may result in low quality photos. Therefore a new automatic focusing method is desired, which can conveniently and accurately adjust the image distance or the focal length of the digital camera.

SUMMARY

An object of the present invention is to provide an automatic focusing method for a digital camera which conveniently and accurately adjusts the image distance or the focal length of the digital camera.

An automatic focusing method for digital camera according to the present invention includes the following steps: providing a digital camera module, which includes a lens member, an image sensor member, a distance-measuring member, a signal-processing member, a drive control member, and a drive member; measuring an object distance using the distance-measuring member, and transmitting the object distance to the signal-processing member for generating a control signal; the drive control member driving the drive member according to the control signal; and the drive member driving the image sensor member or the lens member to a position determined by the control signal. The step of providing the digital camera module includes the following steps: providing the lens member, the image sensor member and the distance-measuring member; measuring a depth of focus of the lens member with a fixed object distance; establishing a range of error of movement of the drive member, based on the depth of focus of the lens member; and selecting a suitable signal-processing member, drive control member, and drive member.

Other objects, advantages and novel features of the invention will become more apparent from the following detailed description of an exemplary embodiment thereof when taken in conjunction with the accompanying drawings, in which:

DETAILED DESCRIPTION OF THE EMBODIMENT

An automatic focusing method for an image system like a digital camera according to an exemplary embodiment of the present invention will be described in relation to a digital camera module. The digital camera module includes a lens member, an image sensor member, a distance-measuring member, a signal-processing member, a drive control member, and a drive member.

The distance-measuring member is used to measure an object distance between an object and the lens member. The distance-measuring member can be an infrared instrument, which measures the object distance by processing the time difference between a first time at which an infrared light beam is transmitted, and a second time at which the infrared light beam is received back after reflection. The drive member can be a stepping motor or an electromagnetic device.

The signal-processing member is used to process the object distance measured by the distance-measuring member, and thereupon produce a control signal. The control signal is transmitted to the drive control member, whereupon the drive control member drives the drive member according to the control signal. The drive member drives the image sensor member or the lens member to a position in which the digital camera module can take high quality photos.

In one embodiment of the present invention, the focal length of the lens member is 4.815 mm, a center spatial frequency of the image sensor member is 160 lps/mm (line pairs/millimeter), and an image height is 2.543 mm. The image sensor member is rectangular, and the image height is half of the length of a diagonal of the image sensor member. The imaging process of the digital camera module can be obtained by software simulation techniques.

The automatic focusing method for a digital camera according to the exemplary embodiment includes the following steps:

A. Providing a digital camera module, which includes a lens member, an image sensor member, a distance-measuring member, a signal-processing member, a drive control member, and a drive member. This step includes the following sub-steps:

1. Providing the lens member, the image sensor member, and the distance-measuring member.

Figure 1:
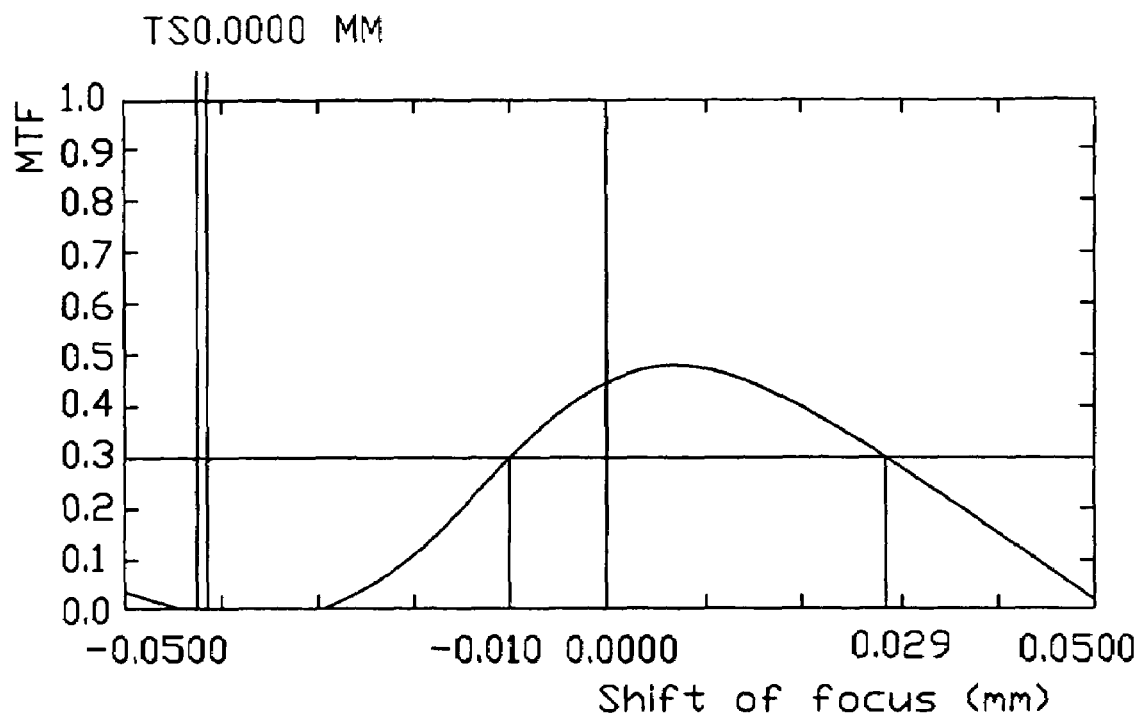
FIG. 1 is a graph of MTF (Modulation Transfer Function) versus shift of focus on a center of an image sensor member, according to the exemplary embodiment of the present invention.
Figure 2:
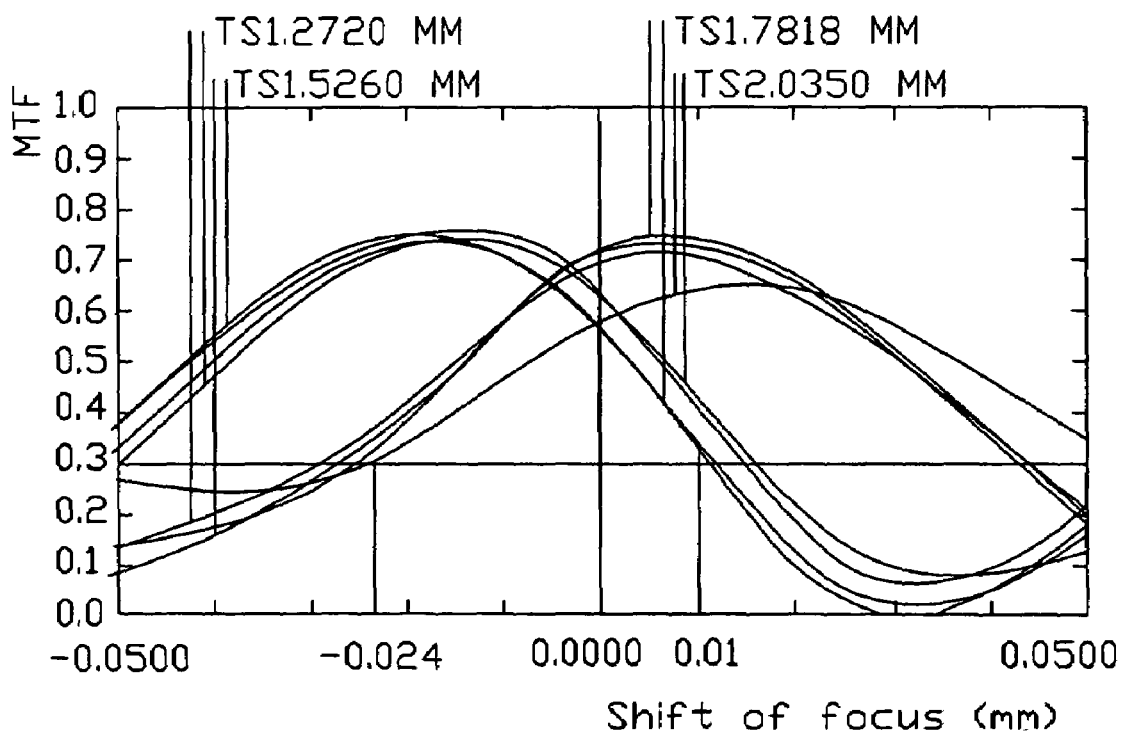
FIG. 2 is similar to FIG. 1, but showing MTFs on a 0.5 field of view, a 0.6 field of view, a 0.7 field of view, and a 0.8 field of view of the image sensor member.

2. Establishing a range of error of movement of the drive member, which includes the following sub-steps:

a. measuring an MTF (Modulation Transfer Function) on a center of the image sensor member, as represented in FIG. 1. In this coordinate system, the horizontal axis represents the shift of focus, and the vertical axis represents the MTF. The MTF is an important parameter of image quality. The higher the numerical value of the MTF, the higher the image quality. The image quality can satisfy general prevailing industry requirements as long as the numerical value of the MTF is not less than 0.3. As shown in FIG. 1, when the numerical value of the MTF is not less than 0.3, a first shift of focus on the axis of the image sensor member is from −0.01 mm to 0.029 mm.

b. Measuring MTFs on a 0.5 field of view, a 0.6 field of view, a 0.7 field of view, and a 0.8 field of view of the image sensor member, when the spatial frequency is 80 lps/mm, as represented in FIG. 2 in similar fashion to FIG. 1. The 0.5 field of view, the 0.6 field of view, the 0.7 field of view, and the 0.8 field of view of the image sensor member are circular, and the centers of the four fields of view are the center of the image sensor member. The radius of the 0.5 field of view is 0.5*2.543 mm=1.272 mm. Similarly, the radius of the 0.6 field of view is 0.6*2.543 mm=1.526 mm, the radius of the 0.7 field of view is 0.7*2.543 mm=1.781 mm, and the radius of the 0.8 field of view is 0.8*2.543 mm=2.035 mm. As shown in FIG. 2, when the numerical values of the MTFs are not less than 0.3, a second shift of focus away from the axis of the image sensor member is from −0.024 mm to 0.01 mm. Therefore the depth of focus of the lens member on the image sensor member is an overlap of the first shift of focus and the second shift of focus, which is from −0.01 mm to 0.01 mm.

c. Calculating the range of error of movement of the drive member, which is half of the depth of focus of the lens member; that is, from 0 mm to 0.01 mm.

Figure 3A:
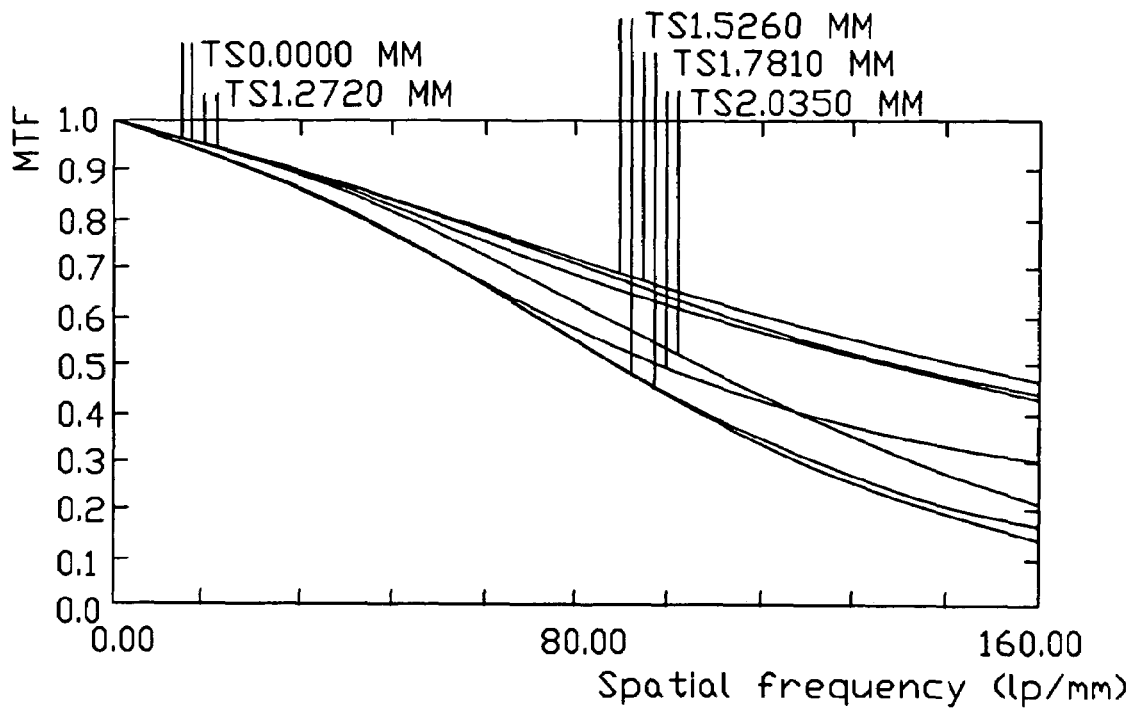
FIG. 3A is a graph of MTFs versus spatial frequency on the center, the 0.5 field of view, the 0.6 field of view, the 0.7 field of view, and the 0.8 field of view of the image sensor member.

3. When the object distance of the lens member is infinity (i.e., when the object distance is not less than 50 times the focal length), measuring the MTFs on the center, the 0.5 field of view, the 0.6 field of view, the 0.7 field of view, and the 0.8 field of view of the image sensor member, making use of a drive member with a range of error of movement, which is from 0 mm to 0.01 mm, as represented in FIG. 3A. In this coordinate system, the horizontal axis represents the spatial frequency, and the vertical axis represents the MTF.

Figure 3B:
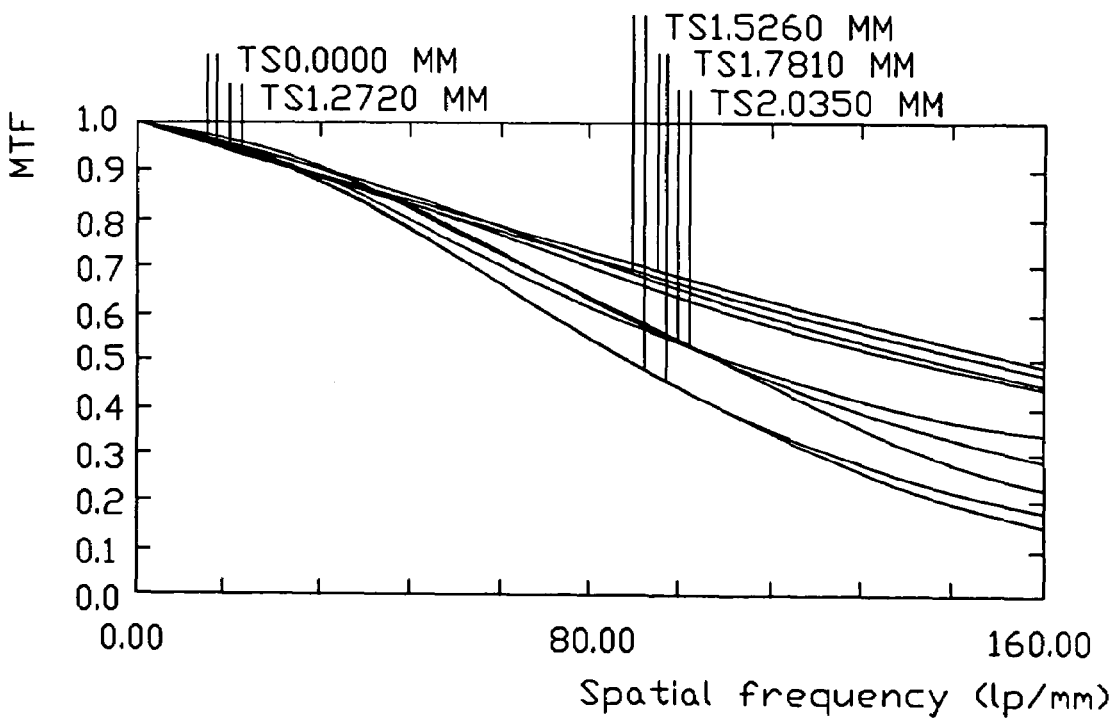
FIG. 3B is similar to FIG. 3A, but showing MTFs when the object distance of the lens member is 1.00 m.

4. Similarly, measuring the MTFs on the image sensor member, when the object distance of the lens member is 1.00 m, as represented in FIG. 3B.

Figure 3C:
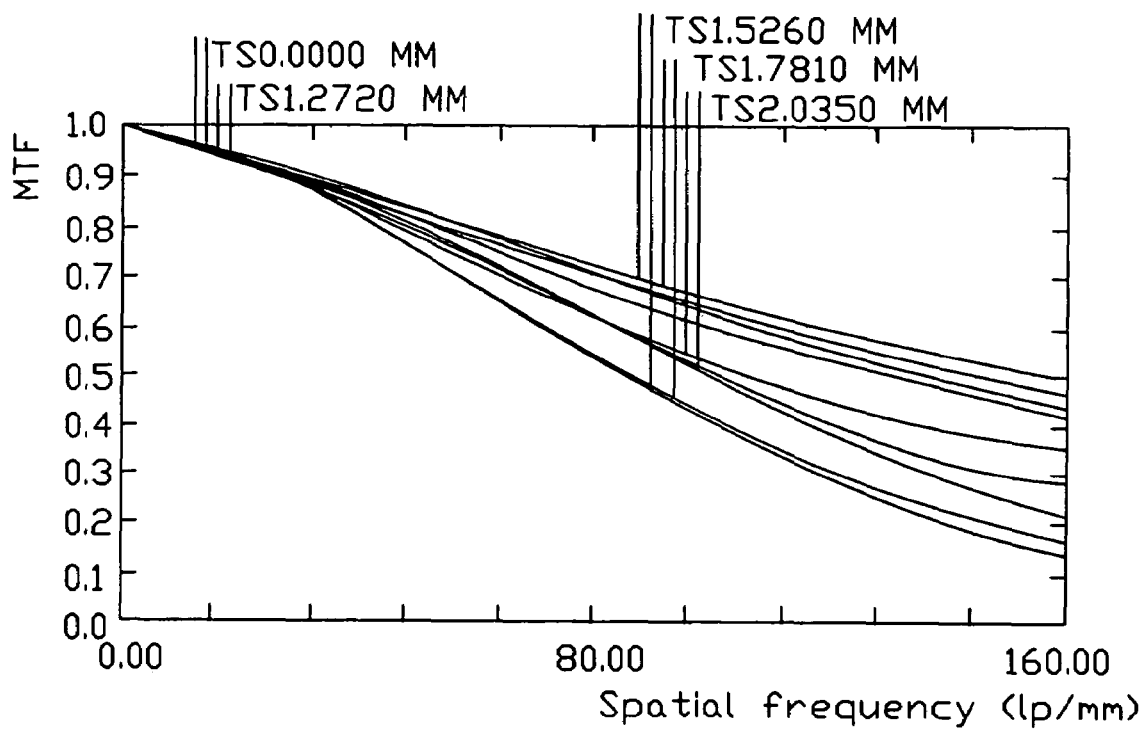
FIG. 3C is similar to FIG. 3A, but showing MTFs when the object distance of the lens member is 0.60 m.

5. Measuring the MTFs on the image sensor member, when the object distance of the lens member is 0.60 m, as represented in FIG. 3C.

Figure 3D:
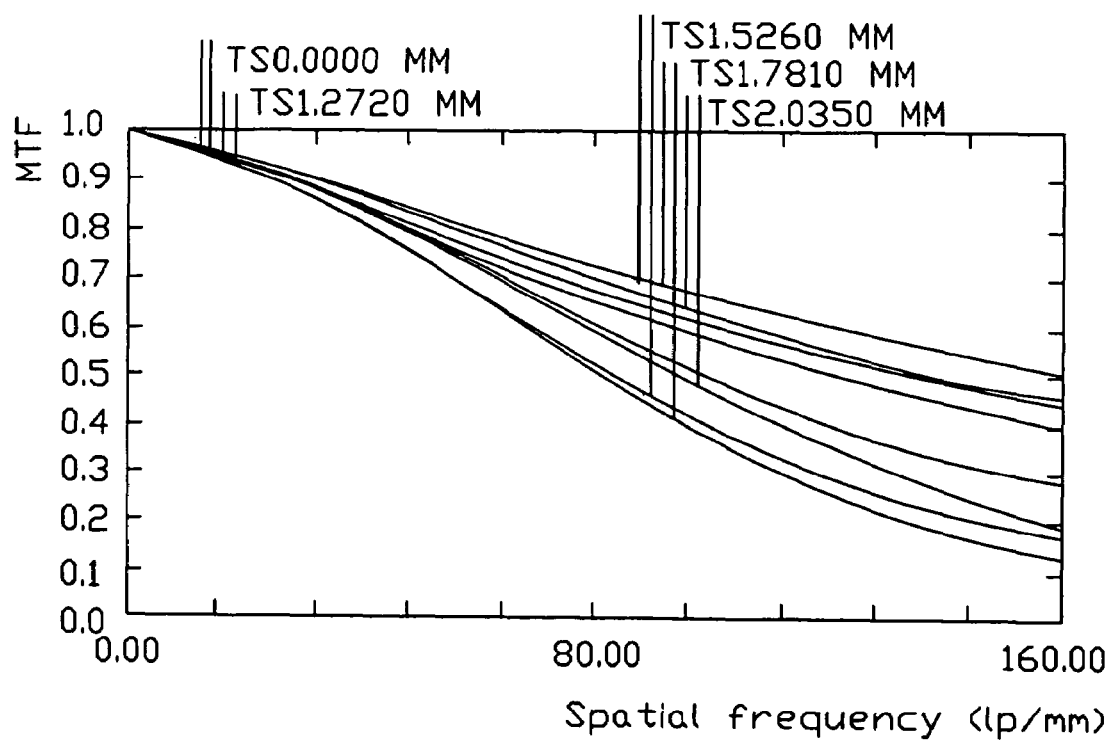
FIG. 3D is similar to FIG. 3A, but showing MTFs when the object distance of the lens member is 0.20 m.
Figure 4:
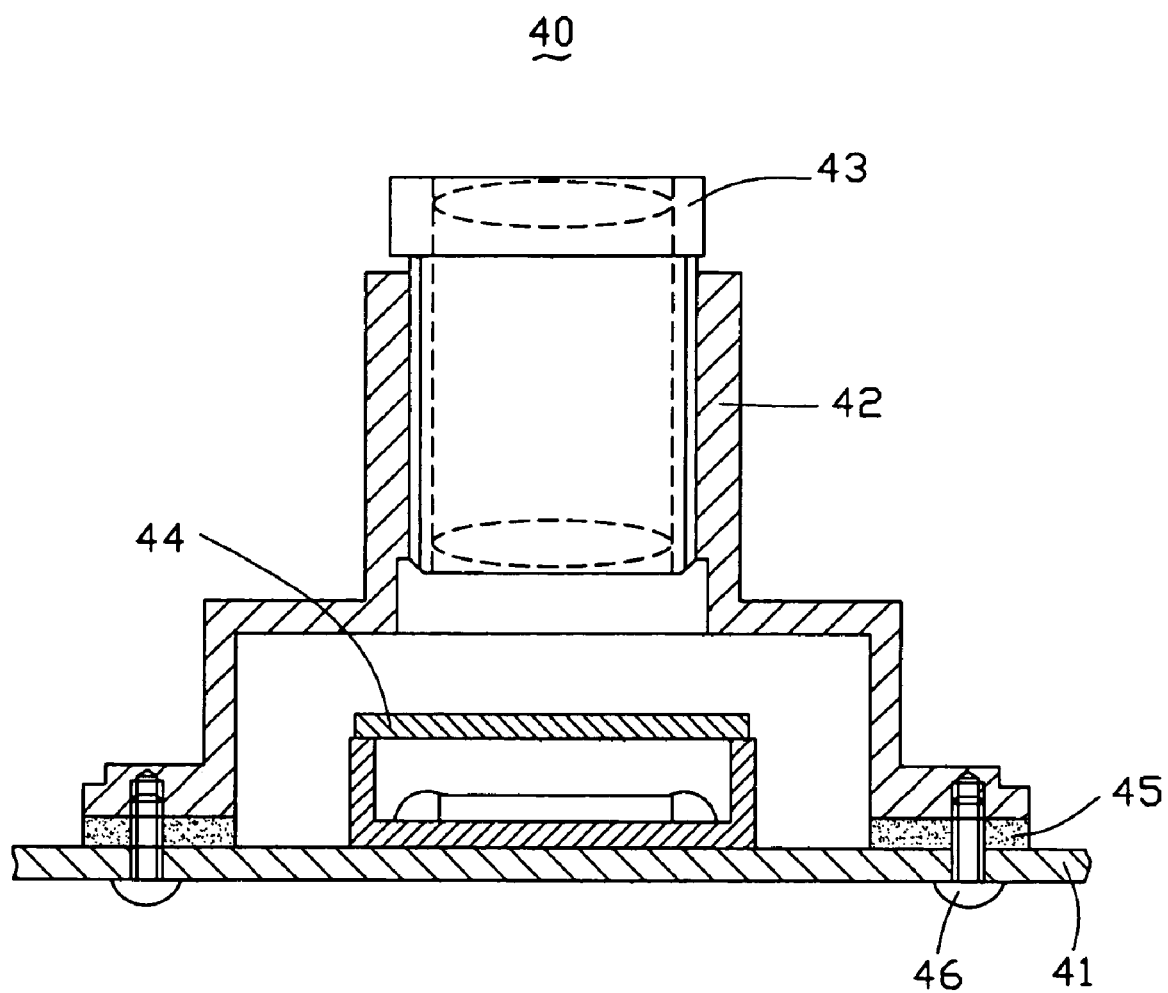
FIG. 4 is a schematic, cross-sectional view of a conventional camera module.

6. Measuring the MTFs on the image sensor member, when the object distance of the lens member is 0.20 m, as represented in FIG. 3D. As shown in FIGS. 3A-3D, when the spatial frequency of the image sensor member is 160 lps/mm, the numerical value of the MTF is not less than 0.4; and when the spatial frequency in the 0.5 field of view, the 0.6 field of view, the 0.7 field of view and the 0.8 field of view of the image sensor member is 80 lps/mm, the numerical value of the MTF is not less than 0.4. Therefore when the object distance is changed from infinity to 0.20 m, the quality of all the images captured by the digital camera module satisfies the general industry requirement.

7. Selecting the suitable signal-processing member, drive control member and drive member according to the range of error of movement.

B. Measuring the object distance using the distance-measuring member, and transmitting the object distance to the signal-processing member, for generating a control signal.

C. The drive control member driving the drive member according to the control signal.

D. The drive member driving the image sensor member or the lens member to a position determined by the control signal, in which the digital camera module can take high quality photos.

It is to be understood, however, that even though numerous characteristics and advantages of the exemplary embodiment have been set forth in the foregoing description, together with details of the structure and function of the exemplary embodiment, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An automatic focusing method for a digital camera, comprising the following steps:

providing a digital camera module, which comprises a lens member, an image sensor member, a distance-measuring member, a signal-processing member, a drive control member, and a drive member;

measuring an object distance by the distance-measuring member, and transmitting the object distance to the signal-processing member, for generating a control signal;

the drive control member driving the drive member according to the control signal; and the drive member driving the image sensor member or the lens member to a position determined by the control signal, wherein:

the step of providing the digital camera module comprises the following steps:

providing the lens member, the image sensor member, and the distance-measuring member;

measuring a depth of focus of the lens member with a fixed object distance;

establishing a range of error of movement of the drive member, based on the depth of focus of the lens member, the range of error of movement of the drive member being not larger than half of the depth of focus of the lens member; and selecting a suitable signal-processing member, drive control member, and drive member;

wherein the step of measuring the depth of focus of the lens member with the fixed object distance comprises the following steps:

measuring a first MTF (Modulation Transfer Function) on the image sensor member, when a first spatial frequency on an axis of the image sensor member is predetermined;

calculating a first shift of focus on the axis of the image sensor member, when the numerical value of the first MTF is required to be in a certain range;

measuring a second MTF on the image sensor member, when a second spatial frequency away from the axis of the image sensor member is predetermined;

calculating a second shift of focus away from the axis of the image sensor member, when the numerical value of the second MTF is required to be in a certain range; and calculating the depth of focus of the lens member, which is an overlap of the first shift of focus and the second shift of focus.

2. The automatic focusing method as claimed in claim 1, wherein the first spatial frequency on the axis of the image sensor member is 160 lps mm (line pairs/millimeter).

3. The automatic focusing method as claimed in claim 2, wherein the numerical value of the first MTF is required to be not less than 0.3.

4. The automatic focusing method as claimed in claim 3, wherein the second spatial frequency away from the axis of the image sensor member is 80 lps/mm.

5. The automatic focusing method as claimed in claim 4, wherein the numerical value of the second MTF is required to be not less than 0.3.

6. The automatic focusing method as claimed in claim 1, wherein the second spatial frequency away from the axis is in a 0.5 field of view, a 0.6 field of view, a 0.7 field of view, or a 0.8 field of view of the image sensor member.

7. The automatic focusing method as claimed in claim 1, wherein the distance-measuring member is an infrared instrument, which measures the object distance by processing the difference between a first time at which an infrared light beam is transmitted, and a second time at which the infrared light beam is received back.

8. The automatic focusing method as claimed in claim 1, wherein the drive member is a stepping motor.

9. The automatic focusing method as claimed in claim 1, wherein the drive member is an electromagnetic device.

10. A method to acquire high quality images for an image system, comprising the steps of:

estimating a depth of focus of a lens member of said image system by means of focusing said lens member on a predetermined object to acquire images of said object for said image system so as to measure acceptable focusing positions of said lens system in case that said high quality images are available on at least two measurable locations of said acquired images;

setting a corresponding range of error of movement of a drive member which is capable of automatically driving said lens member to relative positions in said image system based on said estimated depth of focus of said lens member, wherein said corresponding range of error of movement of said drive member is not larger than half of the depth of focus of said lens member; and performing said corresponding range of error of movement on said drive member of said image system so as to acquire said high quality images for said image system.

11. The method as claimed in claim 10, wherein said at least two measurable locations of said acquired images include a center of said acquired images and a 0.5-field-of-view location of said acquired images away from said center in case that said 0.5 field of view location is acquirable based on an image height of said acquired images.

12. The method as claimed in claim 11, further comprising the step of setting two respective requirements of said high quality images by means of two corresponding values of spatial frequency for said center and said 0.5-field-of-view location of said acquired images away from said center.

13. The method as claimed in claim 10, wherein said depth of focus of said lens member is estimated by means of acquiring an overlapping range of said focusing positions when said focusing positions are measured on said at least two measurable locations of said acquired images respectively.

14. A method to acquire high quality images for an image system, comprising the steps of:

estimating a first shift of focus at a first measurable location of images which is acquired by focusing a lens member of said image system on a predetermined object in case that said high quality images are available in a focusing range based on said first shift of focus;

estimating a second shift of focus at more than one second measurable location of said acquired images in case that said high quality images are available in a focusing range based on said second shift of focus;

acquiring a depth of focus of said lens member by means of selecting an overlapping range from said first and second shifts of focus; and setting a range of error of movement of a drive member, which is capable of automatically driving said lens member to relative positions in said image system, based on said depth of focus in order to acquire said high quality images for said image system, wherein the range of error of movement of said drive member is not larger than half of said depth of focus of said lens member.

15. The method as claimed in claim 14, wherein two corresponding values of spatial frequency are used at said first and said more than one second measurable locations respectively in deciding availability of said high quality images at said locations.

* * * * *